US009333563B2

(12) United States Patent
Uchiuzo et al.

(10) Patent No.: US 9,333,563 B2
(45) Date of Patent: May 10, 2016

(54) DRILLING WORK CONTROL METHOD AND DRILLING WORK DEVICE

(75) Inventors: Hideki Uchiuzo, Namerikawa (JP);
Nobuhiko Kitamura, Kakegawa (JP);
Takamichi Iwamoto, Nakaniikawa-gun (JP); Koshirou Sakamoto, Imizu (JP)

(73) Assignees: SUGINO MACHINE LIMITED, Uozu-shi (JP); MITSUBISHI HEAVY INDUSTRIES, LTD., Tokyo (JP)

( * ) Notice: Subject to any disclaimer, the term of this patent is extended or adjusted under 35 U.S.C. 154(b) by 589 days.

(21) Appl. No.: 13/808,957

(22) PCT Filed: Jul. 8, 2011

(86) PCT No.: PCT/JP2011/065708
§ 371 (c)(1),
(2), (4) Date: Apr. 1, 2013

(87) PCT Pub. No.: WO2012/005356
PCT Pub. Date: Jan. 12, 2012

(65) Prior Publication Data
US 2013/0189043 A1 Jul. 25, 2013

(30) Foreign Application Priority Data

Jul. 9, 2010 (JP) ................................. 2010-156370

(51) Int. Cl.
*B23B 35/00* (2006.01)
*B23B 49/00* (2006.01)
(Continued)

(52) U.S. Cl.
CPC ................ *B23B 49/00* (2013.01); *B23Q 15/12* (2013.01); *G05B 19/4163* (2013.01);
(Continued)

(58) Field of Classification Search
CPC .............. G05B 2219/49088; G05B 19/4163; G05B 2219/49097; B23B 49/00; B23B 2228/36; Y10T 408/03; Y10T 408/16; Y10T 408/18; Y10T 408/20; B23Q 13/12
See application file for complete search history.

(56) References Cited

U.S. PATENT DOCUMENTS 3,418,549 A * 12/1968 Herff ................. G05B 19/4163
318/39
4,346,444 A * 8/1982 Schneider et al. ............ 700/173
(Continued)

FOREIGN PATENT DOCUMENTS

EP 0512867 A2 * 11/1992
EP 2128729 A2 * 12/2009
(Continued)

OTHER PUBLICATIONS

International Search Report issued in International Application No. PCT/JP2011/065708 on Oct. 4, 2011 (with translation).

*Primary Examiner* — Eric A Gates
*Assistant Examiner* — Paul M Janeski
(74) *Attorney, Agent, or Firm* — Oliff PLC (57) ABSTRACT

A drilling work control method includes: automatically discriminating two or more working object layers where load torque applied to a drill forms a hole in a workpiece having plural forming areas formed of materials of different qualities; facilitating drilling work in a working condition set for each working object layer; and improving working efficiency. In a drilling work device that forms the hole in the workpiece having forming layers divided by materials of different qualities, a working object layer determining means determines the layers in order of drilling work based on start of drilling work and variation in load torque applied to the drill, a working condition deciding means decides a set working spindle speed and working feeding speed corresponding to forming materials of the respective layers, and a drive controlling means controls a spindle motor and feeding motor so that the drill forms the hole at the set speeds.

7 Claims, 5 Drawing Sheets

(51) Int. Cl.
*G05B 19/416* (2006.01)
*B23Q 15/12* (2006.01)

(52) U.S. Cl.
CPC .. *B23B 2228/36* (2013.01); *G05B 2219/49088* (2013.01); *G05B 2219/49097* (2013.01); *Y10T 408/03* (2015.01); *Y10T 408/16* (2015.01); *Y10T 408/18* (2015.01); *Y10T 408/20* (2015.01)

(56) References Cited

U.S. PATENT DOCUMENTS

| | | | | |
|---|---|---|---|---|
| 4,688,970 | A * | 8/1987 | Eckman | 408/9 |
| 5,613,810 | A * | 3/1997 | Bureller | 408/3 |
| 6,384,560 | B1 * | 5/2002 | Kakino et al. | 318/566 |
| 8,277,154 | B2 * | 10/2012 | Brown et al. | 408/1 R |
| 8,317,437 | B2 * | 11/2012 | Merkley et al. | 408/9 |
| 2008/0127793 | A1 | 6/2008 | Ikeda | |
| 2011/0020084 | A1 * | 1/2011 | Brett et al. | 408/1 R |
| 2011/0091295 | A1 * | 4/2011 | Elsmark et al. | 408/137 |
| 2012/0107062 | A1 * | 5/2012 | Moraru et al. | 408/17 |

FOREIGN PATENT DOCUMENTS

| | | |
|---|---|---|
| JP | A-61-90851 | 5/1986 |
| JP | A-5-50311 | 3/1993 |
| JP | B2-5-21683 | 3/1993 |
| JP | A-10-11125 | 1/1998 |
| JP | A-11-212618 | 8/1999 |
| JP | A-2002-120219 | 4/2002 |
| JP | A-2004-1120 | 1/2004 |
| JP | A-2008-140037 | 6/2008 |
| JP | A-2009-50942 | 3/2009 |

* cited by examiner

| LAYER | MATERIAL | ROTATIONAL SPEED S [min⁻¹] | FEEDING SPEED F [mm/min] |
|---|---|---|---|
| APPROACH LAYER | | Ss (920) | Fs (180) |
| FIRST WORKING OBJECT LAYER | TITANIUM | S1 (250) | F1 (12) |
| SECOND WORKING OBJECT LAYER | ALUMINUM | S2 (650) | F2 (65) |
| THIRD WORKING OBJECT LAYER | TITANIUM | S3 (250) | F3 (12) |
| FOURTH WORKING OBJECT LAYER | CFRP | S4 (700) | F4 (100) |
| FIFTH WORKING OBJECT LAYER | TITANIUM | S5 (250) | F5 (12) |
| SIXTH WORKING OBJECT LAYER | ALUMINUM | S6 (650) | F6 (65) |
| | | Sf (650) | Ff (30) |
| ADVANCING LAYER AFTER PENETRATION | | Sf (650) | Ff (30) |

DRILLING WORK CONTROL METHOD AND DRILLING WORK DEVICE

TECHNICAL FIELD

The present invention relates to a drilling work control method and a drilling work device in which a hole is formed in a workpiece, which specifically has plural forming areas divided by materials of different qualities (layered product, for example), by relative rotating motion and feeding motion between the workpiece and a tool.

BACKGROUND ART

Drilling work devices are known which include a drive system that makes a workpiece and a tool (drill, for example) execute relative rotating motion and feeding motion in order to form a hole in the workpiece (refer to Patent Literatures 1 to 5, for example).

When a hole is formed in a workpiece by such a drilling work device, from a viewpoint of improving working accuracy and working efficiency or protecting a cutting tool, according to the quality of material of the workpiece and the depth of the hole, working conditions including the spindle speed of the rotating motion or the feeding speed of the feeding motion between the workpiece and the tool are patterned and set beforehand (refer to Patent Literature 2, for example), and are set according to the load torque applied to a tool during drilling work (refer to Patent Literatures 3 to 5, for example). Also, in order to form a deep hole, step feed working may be executed in which after a tool is retracted tentatively to discharge cutting chips, the tool is advanced again (Patent Literatures 2, 3, for example).

CITATION LIST

Patent Literature

Patent Literature 1: JP-A No. 2009-50942
Patent Literature 2: JP-A No. H5-50311
Patent Literature 3: JP-B No. H5-21683
Patent Literature 4: JP-A No. 2004-1120
Patent Literature 5: JP-A No. 2002-120219

SUMMARY OF INVENTION

Technical Problems

In the meantime, when a workpiece of drilling work is formed of materials of different qualities (for example, in a case of a layered product formed of plural layers divided by that layers adjoining each other are formed of materials of different qualities), from the viewpoints of improvement of the working accuracy and working efficiency, protection of tools, or improvement of the quality of the workpiece after working (presence or absence of a burr, for example), and the like, it is preferable to perform drilling with a working condition appropriate to the material that forms respective areas.

Also, with spread of composite materials excellent in strength and light in weight, structures have been increasing in which a member such as a layered product and the like formed of a composite material, for example, CFRP (Carbon Fiber Reinforced Plastics), and a metal is subjected to drilling work.

However, when a worker sets a working condition corresponding to the forming area or selects a working condition set beforehand every time the drilling work in each forming area is started for a workpiece having plural areas divided by being formed of materials of different qualities thus, time and effort are taken, and the working efficiency is lowered. Also, it is preferable to prevent generation of a shape that deteriorates the quality of the workpiece formed with a hole such as occurrence of a burr, scuff and the like when the hole penetrates the workpiece, occurrence of coming off between the forming areas or between the layers adjoining each other and the like.

The present invention has been developed considering such circumstances and its object is to enable to automatically discriminate two or more working object layers formed with a hole in order to form the hole in a workpiece having plural forming areas divided by being formed of materials of different qualities, and to facilitate the drilling work in a working condition set for each working object layer as well as to improve the working efficiency.

Also, the present invention aims to reduce the cost of a drilling work device and to improve the quality of a workpiece formed with a hole.

Solution to Problems

An invention according to claim 1 is a drilling work control method by a drilling work device including a control system (15) controlling drive systems (7, 8) that make a workpiece (50, 60) and a tool (4) that forms a hole (70) in the workpiece (50, 60) execute relative rotating motion and relative feeding motion therebetween, in which the workpiece (50, 60) includes forming areas (51 to 56; 61, 62) of a predetermined number that is a plurality divided by being formed of materials of different qualities, a drive control process of the drive systems (7, 8) by the control system (15) includes a load torque detecting step (S11) that detects load torque (T) applied to the tool (4), a working start determining step (S12) that determines working start of drilling work for the workpiece (50, 60), working object layer determining steps (S13, S18) that determine the two or more forming areas (51 to 56; 61, 62) respectively in order of drilling work as two or more working object layers (51*a* to 56*a*; 61*a*, 62*a*, 61*b*) arrayed in a feeding direction that is a direction of the feeding motion based on the working start and variation of the load torque (T), and a working condition deciding step (S14) that decides spindle speed (S) of the rotating motion and feeding speed (F) of the feeding motion corresponding to materials forming the working object layers (51*a* to 56*a*; 61*a*, 62*a*, 61*b*) determined in the working object layer determining steps (S13, S18), and the tool (4) forms the hole (70) over the two or more working object layers (51*a* to 56*a*; 61*a*, 62*a*, 61*b*).

According to the above, in the workpiece including the forming areas of a predetermined number formed of materials of different qualities, two or more working object layers where drilling work is executed are automatically determined through detection of the load torque applied to the tool, and drilling work can be executed for the respective working object layers determined in a working condition corresponding to each working object layer decided by working condition deciding means. As a result, for the two or more working object layers where the hole is formed, it is not necessary to set the position of the working object layer in the feeding direction beforehand for each working object layer and to set the feeding amount of the feeding motion every time the working object layer is switched corresponding to the thickness of each working object layer, and therefore the efficiency of drilling work can be improved.

An invention according to claim 2 is the drilling work control method according to claim 1 in which the control system (15) determines the working start in the working start determining step (S12) by determining contact of the workpiece (50, 60) and the tool (4) on each other based on variation of the load torque (T).

According to the above, because working start of drilling work is determined utilizing load torque detected for determining the working object layer, exclusive detecting means for determining the working start is not required, and the cost of the drilling work device can be reduced. Also, adjustment of the distance between the initial position of the tool and the workpiece in the feeding direction and setting of the feeding amount until the workpiece and the tool contact on each other are not required which contributes to improvement of the working efficiency.

An invention according to claim 3 is the drilling work control method according to claim 1 or 2 in which the hole (70) is a through hole that penetrates the workpiece (50, 60), the two or more working object layers (51a to 56a; 61a, 62a, 61b) include a working finishing layer (56a, 61b) where an end terminal opening (71) of the hole (70) is formed, the drive control process includes an immediately before penetration determining step (S15, S21) that determines that the tool (4) is at an immediately before penetrating position (Pa) that is immediately before penetrating the workpiece (50, 60) in the working finishing layer (56a, 61b), a working finishing position detecting step (S25) that detects a working finishing position (Pf) where the tool (4) penetrates the workpiece (50, 60) and finishes drilling work, and a feeding speed decelerating step (S24) that makes the feeding speed (F) a slow feeding speed that is slower than a working feeding speed in the working finishing layer (56a, 61b), and the control system (15) controls the drive systems (7, 8) so that the tool (4) moves forward at the slow feeding speed from the immediately before penetration position (Pa) to the working finishing position (Pf).

According to the above, while the tool is from the immediately before penetration position inside the working finishing layer of the workpiece until penetrating the workpiece and reaching the working finishing position, feeding motion is executed at the slow feeding speed that is slower than the working feeding speed for the working finishing layer, therefore occurrence of quality deteriorating shape such as a burr, scuff and the like in the working finishing layer where the end terminal opening of the hole opens can be suppressed, and the quality of the workpiece formed with the hole improves.

An invention according to claim 4 is the drilling work control method according to claim 3 in which the immediately before penetration determining step (S15, S21) includes a working finishing layer determining step (S15) that determines the working finishing layer (56a, 61b) and a load torque reduction determining step (S21) that determines that the load torque (T) has reduced by a predetermined reduction rate or more, and the control system (15) determines that the tool (4) is at the immediately before penetration position (Pa) when reduction of the load torque (T) of the predetermined reduction rate or more has been determined in the working finishing layer (56a, 61b) in the immediately before penetration determining step (S15, S21).

According to the above, in the workpiece including the two or more working object layers, the working finishing layer is automatically determined by the working object layer determining step and the immediately before penetration position of the tool in the working finishing layer is determined utilizing the load torque detected for determining the working object layer, therefore exclusive detecting means for determining the immediately before penetration position is not required, and the cost of the drilling work device can be reduced. Also, setting of the feeding amount for determining the immediately before penetration position is not required which contributes to improvement of the working efficiency.

An invention according to claim 5 is the drilling work control method according to any one of claims 1 to 4 in which, when the two working object layers (51a to 56a; 61a, 62a, 61b) arrayed so as to be adjoining each other in a preceding and following positional relation in order of drilling work are made a preceding working object layer and a following working object layer in the two or more working object layers (51a to 56a; 61a, 62a, 61b), the drive control process includes a thrust force reducing step (S16, S17) that employs an feeding speed for thrust force reduction that is slower than the feeding speed (F) in the preceding working object layer in order to reduce a thrust force by the tool (4) when the load torque (T) becomes a predetermined torque or more during drilling work for the preceding working object layer.

According to the above, because the thrust force of the drill applied to the following working object layer reduces by that the feeding speed in the preceding working object layer decided in the working condition deciding step is decelerated to the feeding speed for thrust force reduction, deflection of the following working object layer by an action of the thrust force is suppressed, occurrence of delamination between the preceding working object layer and the following working object layer can be suppressed, and the quality of the workpiece formed with a hole improves.

An invention according to claim 6 is the drilling work control method according to any one of claims 1 to 5 in which the control system (15) determines the respective working object layers (51a to 56a; 61a, 62a, 61b) in the working object layer determining step (S13, S18) based on whether or not an absolute value of a torque variation coefficient ($\Delta T$) that is a rate of a variation torque amount of the load torque (T) to the load torque (T) is a predetermined variation coefficient or more.

According to the above, because the working object layer is determined based on variation of the torque variation coefficient that is a relative value of the load torque, compared with a case in which the working object layer is determined according to variation of the absolute value of the load torque, excellent determination accuracy of the working object layer can be secured even when the tool is worn due to secular change.

An invention according to claim 7 is the drilling work control method according to any one of claims 1 to 6 in which a relation between a load torque for step feeding and a working time for step feeding for executing step feed working of the feeding motion is set in the control system (15) corresponding to the working object layers (51a to 56a; 61a, 62a, 61b), and the control system (15) determines contact of the workpiece (50, 60) and the tool (4) on each other in the step feed working based on variation of the load torque (T).

According to the above, even when deep hole working becomes necessary in at least one of the two or more working object layers, step feed working that executes drilling work while removing the working chips is executed, and therefore highly accurate drilling work becomes possible for the workpiece including the forming areas of a predetermined number formed of materials of different qualities. Also, because contact of the workpiece and the tool on each other, that is, restart of drilling work is determined utilizing the load torque, setting of the feeding amount until the workpiece and the tool contact on each other becomes unnecessary which contributes to improvement of the working efficiency.

An invention according to claim 8 is the drilling work control method according to any one of claims 1 to 7 in which the control system (15) controls the drive systems (7, 8) so that the spindle speed (S) or the feeding speed (F) in the working object layers (51a to 56a; 61a, 62a, 61b) immediately after determination in the working object layer determining step (S13, S18) gradually increases or gradually reduces from the spindle speed (S) or the feeding speed (F) immediately before determination in the working object layer determining step (S13, S18) to a set spindle speed (S1 to S6) or a set feeding speed (F1 to F6) decided in the working condition deciding step (S14).

According to the above, when drilling work is started for the working object layer determined in the working object layer determining step, the spindle speed or the feeding speed in the working object layer reaches the set spindle speed or the set feeding speed after having gradually changed from spindle speed or feeding speed immediately before determination of the working object layer in the working object layer determining step, therefore working accuracy of the hole improves, and the quality of the workpiece improves.

An invention according to claim 9 is a drilling work device including a tool (4) that forms a hole in a workpiece (50, 60), drive systems (7, 8) that make the workpiece (50, 60) and the tool (4) execute relative rotating motion and relative feeding motion therebetween, and a control system (15) that controls the drive systems (7, 8), in which the workpiece (50, 60) includes forming areas (51 to 56; 61, 62) of a predetermined number that is a plurality divided by being formed of materials of different qualities, the control system (15) includes load torque detecting means (22) that detects load torque (T) applied to the tool (4), working start determining means (31) that determines working start of drilling work for the workpiece (50, 60), working object layer determining means (33) that determines the two or more forming areas (51 to 56; 61, 62) respectively in order of drilling work as two or more working object layers (51a to 56a; 61a, 62a, 61b) arrayed in a feeding direction that is a direction of the feeding motion based on the working start and variation of the load torque (T), working condition deciding means (34) that decides spindle speed (S) and feeding speed (F) corresponding to materials that form the working object layers (51a to 56a; 61a, 62a, 61b) determined by the working object layer determining means (33), and drive controlling means (41, 42) that controls the drive systems (7, 8) so as to execute the rotating motion at the spindle speed (S) and the feeding motion at the feeding speed (F) so that the tool (4) forms the hole (70) over the two or more working object layers (51a to 56a; 61a, 62a, 61b).

According to the above, actions and effects similar to those of the invention described in claim 1 can be exerted.

Advantageous Effects of Invention

According to the present invention, because a hole is formed in a workpiece that includes plural forming areas divided by being formed of materials of different qualities, two or more working object layers formed with a hole can be automatically discriminated, drilling work in a working condition set for each working object layer is facilitated, and the working efficiency can be improved.

Also, according to the present invention, the cost of the drilling work device can be reduced, and the quality of a workpiece formed with a hole can be improved.

BRIEF DESCRIPTION OF DRAWINGS

FIG. 1 is a drawing schematically showing a part of a drilling work device in relation with an embodiment of the present invention, (a) is a front view of an essential part of the drilling work device, and (b) is (a) as viewed along an arrow b.

FIG. 2 is a drawing explaining a workpiece worked by the drilling work device of FIG. 1, (a) shows a cross section of an essential part of the workpiece, (b) is an enlarged view around the top end of a drill of (a), and (c) shows material of each working object layer of the workpiece, set spindle speed, and set feed speed.

DESCRIPTION OF EMBODIMENTS

Below, an embodiment of the present invention will be described referring to FIG. 1 to FIG. 6.

With reference to FIG. 1, a drilling work device 1 in relation with an embodiment of the present invention includes a drilling machine 2 that includes a stand 3 where a workpiece 50 is positioned and fixed and a drill 4 as a tool for cutting for forming a hole 70 that is a through hole in the workpiece 50, and a control system 15 that controls the drilling machine 2. The control system 15 includes a control panel 16 that includes a central processing unit, and an operation panel 17 as an operation unit allowing a worker to set working data including a working condition by the drilling machine 2 and information on the workpiece 50 beforehand. The working data input through the operation panel 17 are stored in a storage device of the control system 15.

In addition to the mounting deck 3 and the drill 4, the drilling machine 2 includes a housing 5 that is fixed to and supported by a support deck or a robot (not shown), a ram 6 as a holding body capable of reciprocating motion in parallel with the feeding direction guided by a guide member (not shown) arranged in the housing 5, a spindle motor 7 that is an electric motor as a spindle drive system arranged in the ram 6 and rotationally driving the drill 4, a feeding motor 8 that is an electric motor as a feed drive system driving the ram 6 in the feeding direction, a transmission mechanism 9 for spindle that transmits rotation of the spindle motor 7 to the drill 4, and a transmission mechanism 10 for feeding that transmits a drive force of the feeding motor 8 to the ram 6.

The ram 6, both the motors 7, 8, and both the transmission mechanisms 9, 10 are accommodated inside the housing 5. The drill 4 is held by the ram 6 through the transmission mechanism 9 for spindle and the spindle motor 7, and is driven by the feeding motor 8 to move in the feeding direction with the ram 6, the spindle motor 7 and the transmission mechanism 9 for spindle.

Here, the feeding direction is parallel to the rotation axis of the drill 4 that is the rotation axis of a spindle 9a included in the transmission mechanism 9 for spindle, and includes an feeding direction that is the direction of drilling work and a retracting direction that is the direction opposite to the feeding direction.

The spindle motor 7 makes the workpiece 50 and the drill 4 execute relative rotating motion therebetween by making the drill 4 execute rotating motion that is a rotational cutting motion, and the feeding motor 8 makes the workpiece 50 and the drill 4 execute relative feeding motion therebetween by making the drill 4 execute feeding motion. Here, the spindle motor 7 and the feeding motor 8 constitute a drive system of the drilling machine 2.

Also, the feeding motor 8 includes a torque limiter 8a that limits torque applied to the feeding motor 8. The torque limiter 8a is capable of changing a limit value that is an upper limit value of the torque by adjusting a force (magnetic force, for example) for setting the limit value.

The transmission mechanism 9 for spindle includes the spindle 9a connected to a rotational shaft of the spindle motor 7, and a chuck 9b arranged at the top end of the spindle 9a so as to rotate integrally with the spindle 9a with the drill 4 being detachably mounted thereto. The spindle motor 7 and the spindle 9a are accommodated inside the ram 6 of a cylindrical shape.

The transmission mechanism 10 for feeding includes a ball screw mechanism 10b constituted of a ball screw 10c connected to a rotational shaft of the feeding motor 8 through a speed reduction mechanism 10a and a ball nut 10d screwed to the ball screw 10c, and a supporter 10e connected to the ram 6 and moving in the feeding direction integrally with the ball nut 10d, and converts rotating motion of the feeding motor 8 to translation motion of the ram 6, the spindle motor 7, the spindle 9a, the chuck 9b and the drill 4 in the feeding direction. Accordingly, the drill 4 can move in a range of a maximum stroke A in the feeding direction driven by the feeding motor 8. In FIG. 1(b), a part of each of the drill 4, the chuck 9b and the ram 6 when they are moved by the maximum stroke A is shown in two-dot chain lines.

With reference also to FIG. 2, the workpiece 50 is a laminated product having a laminated structure formed of plural layers 51 to 56 as forming areas, six here, divided by materials of different qualities, and includes the first to sixth forming layers 51 to 56 in order from the working start side of the drilling work. In the first to sixth forming layers 51 to 56, the forming layers 51, 52; 52, 53; 53, 54; 54, 55; 55, 56 adjoining each other in the feeding direction of the drill 4 contact with each other.

Figure 2A:
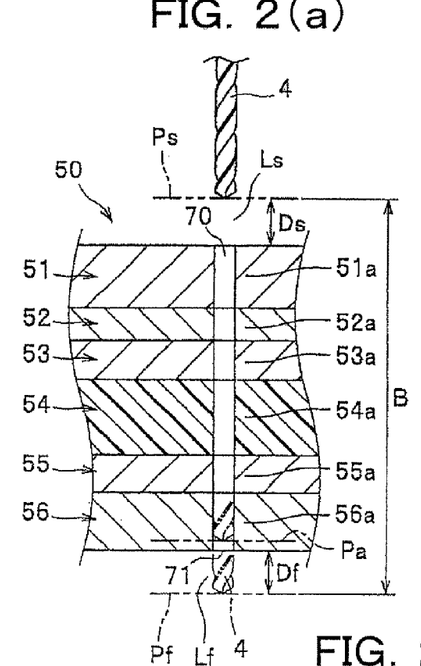
Figure 2B:
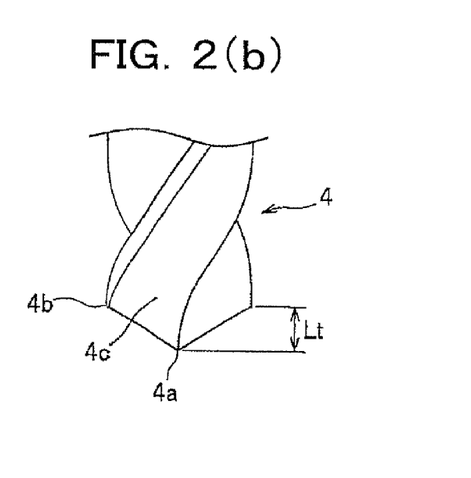
Figure 2C:
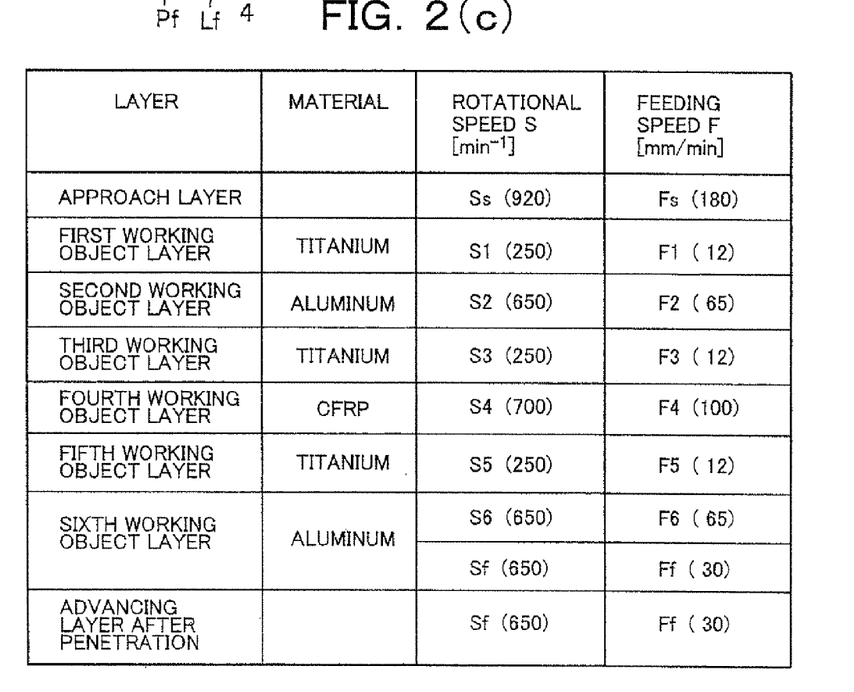

The first, third and fifth forming layers 51, 53, 55 are formed of a titanium alloy or titanium (shown as titanium in FIG. 2(c)) as a first metal that is a first material, the second and sixth forming layers 52, 56 are formed of an aluminum alloy or aluminum (shown as aluminum in FIG. 2(c)) as a second metal that is a second material, and the fourth forming layer 54 is formed of a composite material, CFRP here, as a non-metal material that is a third material.

Also, the first to sixth forming layers 51 to 56 include first to sixth working object layers 51a to 56a respectively that are portions where the hole 70 is formed. Accordingly, each of the working object layers 51a to 56a is a surrounding portion of the hole 70 in the workpiece 50 formed with the hole 70.

Further, combination of the kind of the two or more materials of different qualities forming the workpiece 50 is optional, and combination of the kind of materials of the working object layers adjoining each other in the feeding direction is also optional.

As shown in FIG. 2(a), when the distance from an initial position Ps where the drill 4 starts the advance for starting drilling work to a working finishing position Pf where the drilling work finishes and the advance of the drill 4 finishes is made a working stroke B, inside the working stroke B, the workpiece 50, an approach layer Ls from the initial position Ps of the drill 4 (that is, an advance starting position) to where the drill 4 contacts on the first working object layer 51a of the workpiece 50 and a post-penetration advance layer Lf over which the drill 4 starts from the sixth working object layer 56a of the workpiece 50 after penetrating the sixth working object layer 56a and reaches the working finishing position Pf (that is, the advance finishing position) exist. The approach layer Ls and the post-penetration advance layer Lf are air layers which are non-working layers not equivalent to layers that become objects of drilling work in the workpiece 50.

Also, the hole 70 penetrates each of the first to sixth working object layers 51a to 56a, and is formed so as to penetrate from the first working object layer 51a over to the sixth working object layer 56a. Accordingly, the first working object layer 51a is a working starting layer where drilling work is started in the workpiece 50, and the sixth working object layer 56a is a working finishing layer where an end terminal opening 71 as an end terminal part of the hole 70 is formed and drilling work finishes.

Figure 3:
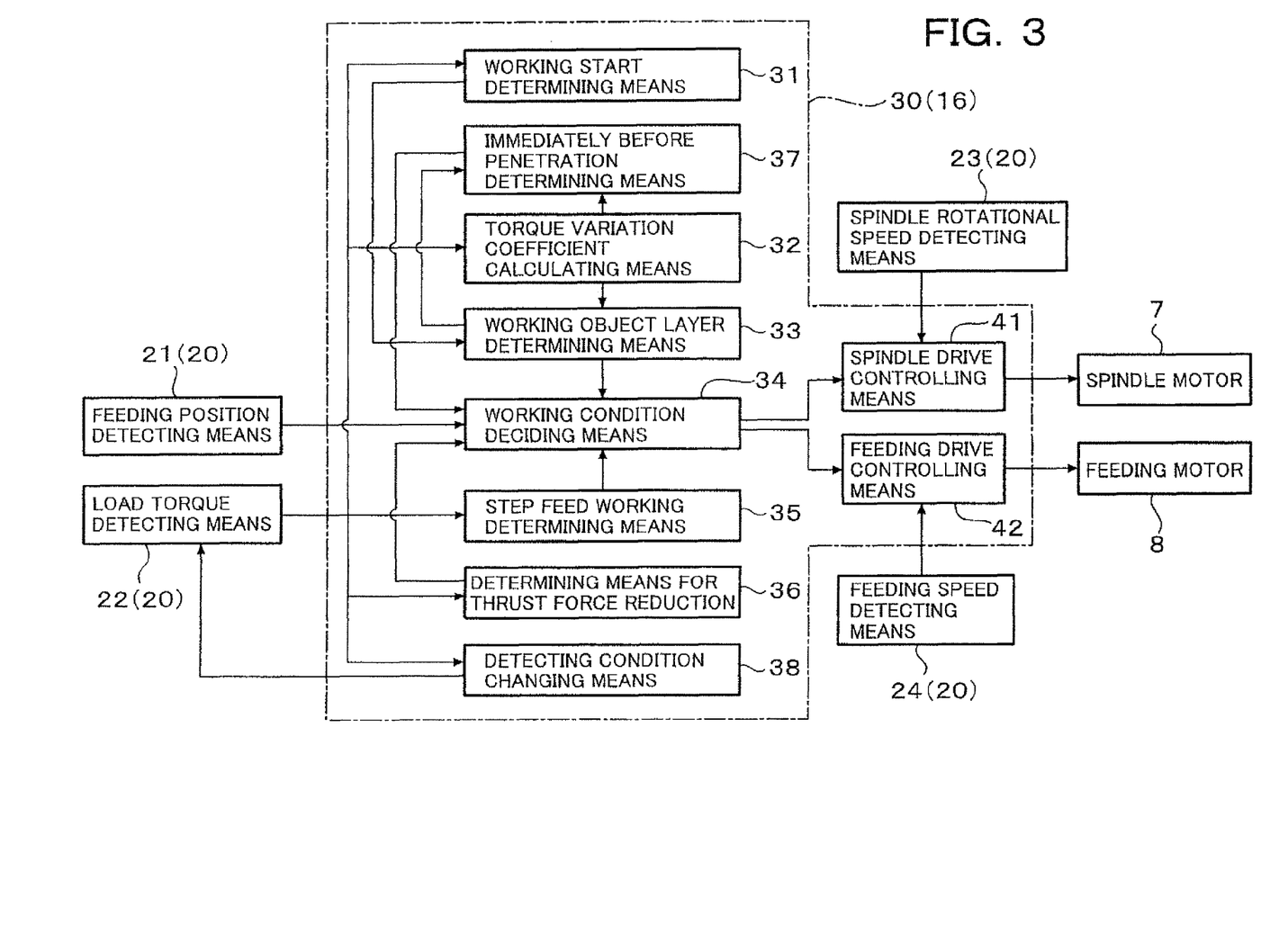
FIG. 3 is a block diagram of an essential part of a control panel of the drilling work device of FIG. 1.

With reference to FIG. 3, the control panel 16 (refer to FIG. 1) includes a detection unit 20 that detects a state of the drilling machine 2 and a control unit 30 that controls motion of the respective motors 7, 8.

The detection unit 20 includes feeding position detecting means 21 that detects the position in the feeding direction of the drill 4 (or the spindle 9a) that is a member executing feeding motion, load torque detecting means 22 that detects load torque T applied to the drill 4 in a process of feeding motion, spindle speed detecting means 23 that detects a rotational speed of the spindle motor 7 as a spindle speed S of the drill 4 (or the spindle 9a) that executes rotating motion (refer to FIG. 2(c)), and feeding speed detecting means 24 that detects a rotational speed of the feeding motor 8 as a feeding speed F of the drill 4 (or the spindle 9a) (refer to FIG. 2(c)).

The load torque detecting means 22 detects an electric current value that is a motor drive signal value for driving the feeding motor 8 (hereinafter referred to as "motor electric current value") and detects the load torque T of the drill 4. More specifically, the motor electric current value is sampled by a predetermined number of times of sampling at every predetermined temporal interval, and an average value by a method of moving averages of the number of times of sampling is made the load torque T.

With reference also to FIG. 2, the feeding position detecting means 21 constituted of an encoder for example detects the initial position Ps as an origin, and detects the position of the drill 4 in the feeding direction relative to the initial position Ps. Here, the initial position Ps is set beforehand as a position where a distal end 4a of the drill 4 departs from the workpiece 50 in the feeding direction by a predetermined approach distance Ds. Also, the feeding position detecting means 21 detects the working finishing position Pf of drilling work by the drill 4. According to this embodiment, the working finishing position Pf is a position where the distal end 4a of the drill 4 that has penetrated the workpiece 50 departs from the workpiece 50 in the feeding direction by a predetermined penetration distance Df.

In this embodiment, the position of the drill 4 in the feeding direction is equivalent to the position in the feeding direction of the supporter 10e, the ram 6 and the spindle 9a (all are to be referred to FIG. 1) that move in the feeding direction integrally with the drill 4.

The control unit 30 includes working start determining means 31 that determines working start of drilling work by determining contact of the workpiece 50 and the drill 4 on each other, torque variation coefficient calculating means 32 that calculates a torque variation coefficient $\Delta T$ of the load torque T based on the load torque T detected by the load torque detecting means 22, working object layer determining means 33 that determines two or more forming layers forming the workpiece 50 which are six forming layers of the first to sixth forming layers 51 to 56 in this embodiment as two or more of the first to sixth working object layers 51a to 56a, which are six working object layers here arranged in the feeding direction in order of drilling work, based on variation of the load torque T detected by the load torque detecting means 22, working condition deciding means 34 that decides a working condition including spindle speed S and a feeding speed F in the respective working object layers 51a to 56a corresponding to materials that form the respective working object layers 51a to 56a, step feed working determining means 35 for executing step feed working, determining means 36 for thrust force reduction that determines a working state in which a thrust force applied to the workpiece 50 by the drill 4 in feeding motion should be reduced, immediately before penetration determining means 37 that determines that the drill 4 during drilling work is at an immediately before penetration position Pa that is a position in the feeding direction immediately before penetrating the workpiece 50, detecting condition changing means 38 that changes a detecting condition for the load torque T by the load torque detecting means 22 according to a state of the drilling machine 2, spindle drive controlling means 41 that includes an inverter and controls a rotational speed of the spindle motor 7 (accordingly, the spindle speed 8), and feeding drive controlling means 42 that includes a servo amplifier and controls a rotational speed of the feeding motor 8 (accordingly, the feeding speed F).

Here, the spindle drive controlling means 41 and the feeding drive controlling means 42 constitute drive controlling means and control the spindle motor 7 and the feeding motor 8 respectively so as to obtain the spindle speed S and the feeding speed F decided by the working condition deciding means 34.

Figure 1A:
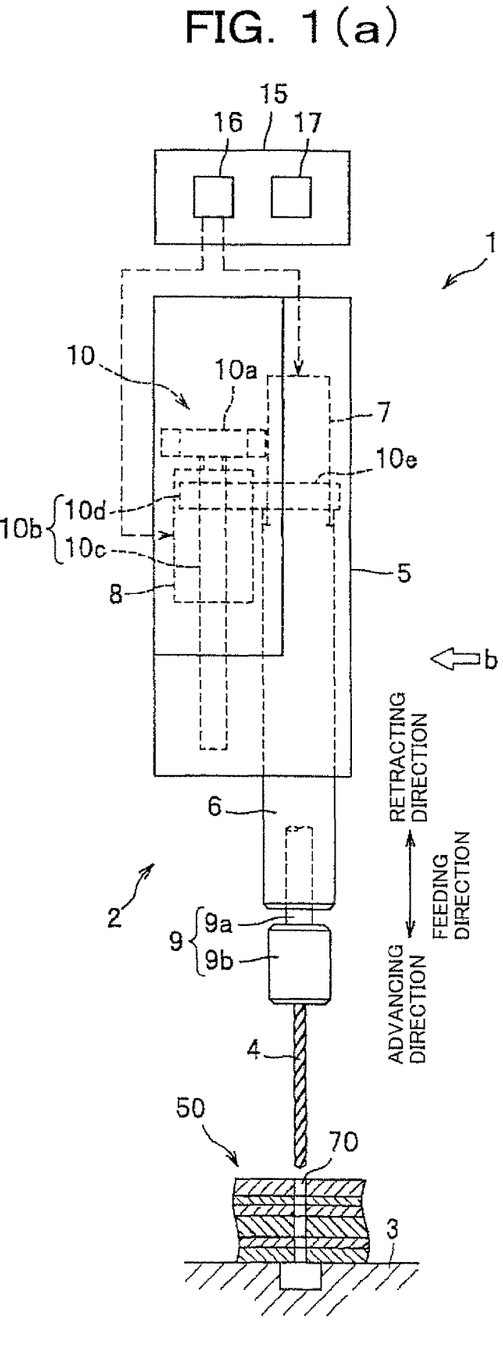
Figure 1B:
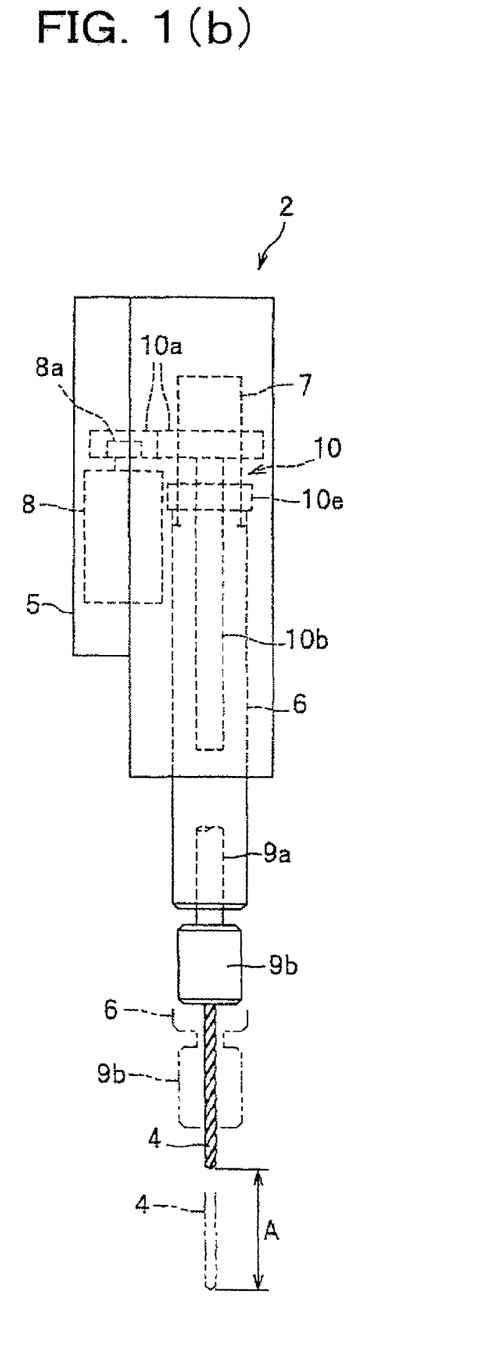

With reference to FIG. 2, the operation panel 17 (refer to FIG. 1(a)) is of a touch panel type for example, and includes a start/stop switch, an input unit, and a display unit. Through the input unit, a worker inputs data on the workpiece 50 including the layout of the first to sixth working object layers 51a to 56a that are portions where the hole 70 is formed in the workpiece 50, data on a working condition appropriate for drilling work such as the spindle speed S, the feeding speed F, and the like, and the working data including position data in the feeding direction including the initial position Ps, the working finishing position Pf, and the retracting position in step feeding as set values.

Here, the layout of the working object layers 51a to 56a is in order of drilling work in the workpiece 50, and is the layout in the feeding direction. Also, in the working condition, an operating condition of the drilling work device 1 when not working while the drilling machine 2 is in operation is to be also included.

The set spindle speed includes a set working spindle speed S1 to S6 that is a working spindle speed for each of the working object layers 51a to 56a when the drill 4 executes drilling work for the respective working object layers 51a to 56a, a set spindle speed for immediately before penetration Sf that is a spindle speed for immediately before penetration in an immediately before penetration process, a set approach spindle speed Ss that is an approach spindle speed in an approach process, and a set zero return rotational speed that is a return rotational speed in an return to origin process. The approach rotational speed is faster than the working rotational speed for the respective working object layers 51a to 56a.

Here, the immediately before penetration process is a process starting when the drill 4 is at the immediately before penetration position Pa until reaching the working finishing position Pf, the approach process is a process starting when the drill 4 is at the initial position Ps until contacting on the workpiece 50, and the return to origin process is a process starting when the drill 4 is at the working finishing position Pf until returning to the initial position Ps.

Also, the set feeding speed includes a set working forward speed F1 to F6 that is a working feeding speed for each of the working object layers 51a to 56a when the drill 4 executes drilling work for the respective working object layers 51a to 56a, a set slow forward speed Ff that is a feeding speed for immediately before penetration in an immediately before penetration process, a set approach feeding speed Fs that is an approach forward speed in an approach process, a set zero return backward speed that is a return backward speed in an return to origin process, a set forward speed for thrust force reduction that is an forward speed for thrust force reduction in limiting a thrust force of the drill 4, and each of a set backward speed in step feeding that is a backward speed in step feeding and a set approach forward speed in step feeding that is an approach forward speed in step feeding when the drill 4 moves backward and forward in step feed working.

The approach forward speed, the return backward speed, the approach forward speed in step feeding, and the backward speed in step feeding are faster than each of the working forward speed. The set approach forward speed Fs, the set zero return speed, the set approach forward speed in step feeding, and the set backward speed in step feeding may be set equal to each other, and are set to a maximum speed in the feeding motor 8 here.

On the other hand, the slow forward speed is slower than the working forward speed in the sixth working forming layer 56a that is the working finishing layer, and the forward speed for thrust force reduction is slower than each of the working forward speed.

FIG. 2(c) shows numerical values that are examples of the set working spindle speed 51 to S6 and the set working forward speed F1 to F6 in parentheses.

The control unit 30 will be further described referring to FIG. 2 and FIG. 3.

The working start determining means 31 determines contract of the workpiece 50 and the drill 4 on each other based on the load torque T detected by the load torque detecting means 22. More specifically, when the load torque T has become a predetermined torque for working start or more due to contract of the drill 4 and the first working object layer 51a on each other from a state where the load torque T is generally zero while the drill 4 moves over the approach distance Ds forward after starting to move from the initial position Ps until contracting on the workpiece 50, the drill 4 is determined to have contracted on the workpiece 50, and accordingly, working start (that is, at the time of biting) is determined.

The torque variation coefficient ΔT is calculated based on newest load torque T detected by the load torque detecting means 22 (hereinafter referred to as "newest load torque") and the load torque T detected immediately before the newest load torque (hereinafter referred to as "immediately before load torque"), and is calculated more specifically as a ratio of a variation torque amount (that is, the difference between the newest load torque and the immediately before load torque) to the immediately before load torque.

The working object layer determining means 33 determines the first working object layer 51a as a first working object layer when working start has been determined by the working start determining means 31. Also, when the two working object layers (for example, the first and second working object layers 51a, 52a, the second and third working object layers 52a, 53a, the third and fourth working object layers 53a, 54a, and the like) arrayed so as to be adjoining each other in a preceding and following positional relation in order of drilling work in the workpiece 50 are made a preceding working object layer (for example, the first working object layer 51a) and a following working object layer (for example, the second working object layer 52a) after the first working object layer 51a has been determined, the working object layer determining means 33 determines that the working object layer has been changed from the preceding working object layer to the following working object layer positioned after the preceding working object layer in order of drilling work when an absolute value of the torque variation coefficient ΔT at the time of drilling work in a working condition in the preceding working object layer has changed by a predetermined variation coefficient or more with respect to the load torque T applied to the drill 4 that has been executing drilling work for the preceding working object layer.

Also, the working object layer determining means 33 determines the second to sixth working object layers 52a to 56a (that are the second to sixth forming layers 52 to 56 also) that are the remaining five working object layers included in the workpiece 50 other than the first working object layer (that is, the first working object layer 51a) based on the times of occurrence of variation of the load torque T by a predetermined variation coefficient or more after working start has been determined by the working start determining means 31 and the layout of the working object layers 51a to 56a of the workpiece 50 set beforehand through the operation panel 17.

Thus, determining processes that determine the working object layers 52a to 56a other than the first working object layer 51a are executed one by one between the first and second working object layers 51a, 52a, between the second and third working object layers 52a, 53a, between the third and fourth working object layers 53a, 54a, between the fourth and fifth working object layers 54a, 55a, and between the fifth and sixth working object layers 55a, 56a, and the respective working object layers 51a to 56a in the workpiece 50 are determined respectively in order of drilling work.

In other words, with respect to the working object layers 52a to 56a other than the first working object layer 51a, based on variation of the load torque T applied to the drill 4 during working the preceding working object layer where drilling work is executed preceedingly between the working object layers 51a, 52a; 52a, 53a; 53a, 54a; 54a, 55a; 55a, 56a that contact with each other in the feeding direction, the following working object layers that follow the preceding working object layers are determined, and these determining processes are repeated until the following working object layer becomes the working finishing layer (the sixth working object layer 56a in this embodiment).

Here, the predetermined variation coefficient is set beforehand based on forming materials of the respective working object layers 51a to 56a according to combination of the preceding working object layers and the following working object layers.

Also, when the working object layers 51a to 56a where drilling work is started has been determined by the working object layer determining means 33, the working condition deciding means 34 retrieves the set spindle speed and the set feeding speed stored in the storage device of the control system 15 in order to decide the spindle speed S and the feeding speed F in the working object layers 51a to 56a and decides the spindle speed S and the feeding speed F at the set working spindle speed S1 to S6 and the set working feeding speed F1 to F6 corresponding to each of the working object layers 51a to 56a, and drilling work for each of the working object layers 51a to 56a is executed in an appropriate working condition.

In a pair of the preceding working object layer and the following working object layer, the determining means 36 for thrust force reduction determines a working state in which the load torque T detected by the load torque detecting means 22 becomes equal to or greater than a predetermined torque for thrust force reduction set beforehand during drilling work for the preceding working object layer. When it has been determined by the determining means 36 for thrust force reduction that the load torque T of the predetermined torque for thrust force reduction or more has been applied to the drill 4, the working condition deciding means 34 decides the feeding speed F at a set speed for thrust force reduction that is slower than the set working speed decided corresponding to the preceding working object layer.

This feeding speed for thrust force reduction is set from the viewpoint of suppressing deflection of the following working object layer based on the forming material and the thickness of the following working object layer, the feeding speed F in the preceding working object layer, and the like.

Also, the set load torque in step feeding and the set working time in step feeding for the case of executing step feed working during drilling work in the respective working object layers 51a to 56a are set beforehand through the operation panel 17 corresponding to the respective working object layers 51a to 53a, 55a, 56a excluding the fourth working object layer 54a that is formed of CFRP as a step feed working start condition that constitutes a part of the working data.

If the load torque T detected by the load torque detecting means 22 is the load torque for step feeding and when it has been detected that the working time for step feeding corresponding to the load torque for step feeding has elapsed by time measuring means (not shown) that constitutes the detection unit 20, the step feed working determining means 35 determines that the step feed working start condition has been established.

Also, when it has been determined by the step feed working determining means 35 that the step feed working start condition has been established, the working condition deciding means 34 decides the feeding speed F at the set backward speed in step feeding and the set approach forward speed in step feeding while maintaining the spindle speed S at the set working speed in the working object layer during working, and step feed working is executed.

Further, contact of the workpiece 50 and the drill 4 on each other in step feed working is determined by working restart determining means for step feeding based on variation of the load torque T detected by the load torque detecting means 22. More specifically, when the load torque T in the approach process in step feeding becomes a predetermined torque in step feeding or more due to contact of a working object layer and the drill 4 on each other during working at a time point when moving backward in step feed working is started, the working restart determining means for step feeding determines that the drill 4 has contacted on the workpiece 50, and therefore restart of drilling work is determined.

In this step feed working, a position of the drill 4 tentatively moving back is set to the initial position Ps. As another example, the position in step feeding may be set so that the top end 4a of the drill 4 is inside the workpiece 50 or closer to the workpiece 50 than the initial position Ps.

When the drill 4 approaches the immediately before penetration position Pa of the workpiece 50, because the thickness of the working remaining part reduces in the sixth working object layer 56a that is the working finishing layer, the load torque T reduces. Accordingly, when it is determined that the working object layer is the sixth working object layer 56a by the working object layer determining means 33 and it has been determined that the torque variation coefficient ΔT calculated by the load the torque variation coefficient calculating means 32 based on the load torque T is a reduction rate of a predetermined reduction rate or more, the immediately before penetration determining means 37 determines that the drill 4 is at the immediately before penetration position Pa. The predetermined reduction rate is obtained by an experiment and simulation based on the material of the sixth working object layer 56a, the working spindle speed and working feeding speed in the sixth working object layer 56a, the thickness of the working remaining part, and the like.

Also, when it has been determined by the immediately before penetration determining means 37 that the drill 4 is at a position near to penetration, the working condition deciding means 34 decides the spindle speed S and the feeding speed F at the set spindle speed for immediately before penetration and the set slow feeding speed Ff respectively, and the set working feeding speed F6 is decelerated to the set slow feeding speed Ff. Although the set spindle speed for immediately before penetration is maintained at the set working spindle speed S6 in the sixth working object layer 56a in this embodiment, as another example, it may be set slower than the set working spindle speed S6, and the effect of preventing occurrence of a quality deteriorating shape is improved in the case.

Here, the quality deteriorating shape is a shape such as a burr, scuff, or delamination described below, and the like that occurs when the drill 4 penetrates the workpiece 50 and deteriorates the quality of the workpiece 50.

The set slow feeding speed Ff is set from the viewpoint of preventing occurrence of the quality deteriorating shape, and is set according to the quality of the sixth working object layer 56a. Also, the set slow feeding speed Ff is maintained constant after the drill 4 penetrates the workpiece 50 until reaching the working finishing position Pf. As another example, the set slow feeding speed Ff may also change within a range slower than the set feeding speed in the sixth working object layer 56a between the immediately before penetration position Pa and the working finishing position Pf provide that the quality deteriorating shape does not occur. For example, by being adjusted so that the slow feeding speed increases, working time can be shortened while preventing occurrence of the quality deteriorating shape.

Also, the working condition deciding means 34 decides the feeding speed F at the set approach feeding speed Fs during the approach process, and decides the feeding speed F at the set return backward speed during the return to origin process after the drill 4 has reached the working finishing position Pf.

The spindle drive controlling means 41 feedback-controls the spindle motor 7 so that the drill 4 executes rotating motion at the set working spindle speed S1 to S6 based on a spindle speed detected by the spindle speed detecting means 23. Similarly, the feeding drive controlling means 42 feedback-controls the feeding motor 8 so that the drill 4 executes feeding motion at the set feeding speed based on a feeding speed detected by the feeding speed detecting means 24.

Also, immediately after the working object layers 51a to 56a have been determined by the working object layer determining means 33, the spindle drive controlling means 41 and the feeding drive controlling means 42 control the respective motors 7, 8 so that at least either speed of the spindle speed S and the feeding speed F can be set to values different from the set working spindle speed S1 to S6 and the set working feeding speed F1 to F6 set for the working object layers 51a to 56a (hereinafter referred to as "override control").

More specifically, the respective motors 7, 8 are override-controlled so that, when the drill 4 moves forward in the approach layer Ls to contact on the workpiece 50 and drilling work for the workpiece 50 (drilling work for the first working object layer 51a here) is started (that is, at the time of biting), at least either speed of the spindle speed S and the feeding speed F is decelerated once from the set approach spindle speed Ss and the set approach feeding speed Fs in the approach layer Ls to the predetermined spindle speed and the predetermined feeding speed respectively, and is thereafter gradually increased to the set working spindle speed S1 and the set working feeding speed F1 in the first working object layer 51a respectively.

Here, the predetermined spindle speed is slower than the set approach spindle speed Ss and the set working spindle speed S1 in the first working object layer 51a, and the predetermined feeding speed is slower than the set approach feeding speed Fs and the set working feeding speed F1.

Also, as another example, when the first working object layer 51a has been determined by the working object layer determining means 33, override-control may be executed after the drill 4 moves backward once by a predetermined distance (1 mm, for example).

Further, when drilling work shifts from a working object layer of a quality with high hardness to a working object layer of a quality with lower hardness, the respective motors 7, 8 are override-controlled so that at least either speed of the spindle speed S and the feeding speed F gradually increases according to the hardness.

In addition, when drilling work shifts from a working object layer of a quality with low hardness to a working object layer of a quality with higher hardness, the respective motors 7, 8 are override-controlled so that at least either speed of the spindle speed S and the feeding speed F gradually reduces according to the hardness.

<Override Control in Starting Drilling Work>

Also, in this embodiment, in starting drilling work, the spindle drive controlling means 41 override-controls the spindle motor 7 so that the spindle speed S in the first working object layer 51a immediately after being determined by the working object layer determining means 33 is decelerated once to the predetermined spindle speed that is slower than the set approach spindle speed Ss and the set working spindle speed S1 and thereafter gradually increases from the predetermined spindle speed to the set working spindle speed S1 that has been set for the first working object layer 51a. As another example, in override control in starting drilling work, the spindle speed S may be made the set working spindle speed S1 immediately without going through the predetermined spindle speed.

Similarly, the feeding drive controlling means 42 override-controls the feeding motor 8 so that, in starting drilling work, the feeding speed F in the first working object layer 51a is decelerated once to the predetermined feeding speed that is slower than the set approach feeding speed Fs and thereafter gradually increases from the predetermined feeding speed to the set working feeding speed F1 that has been set for the first working object layer 51a.

<Override Control During Drilling Work>

Also, during drilling work in the workpiece, the spindle drive controlling means 41 override-controls the spindle motor 7 so that the spindle speed S in the working object layers 52a to 56a immediately after being determined by the working object layer determining means 33 gradually increases (that is, gradual increase) or gradually reduces (that is, gradual reduction) from the set working spindle speed S1 to S5 that is the spindle speed S immediately before determination by the working object layer determining means 33 to the set working spindle speed S2 to S6 that has been set for the working object layers 52a to 56a.

Similarly, during drilling work in the workpiece, the feeding drive controlling means 42 override-controls the feeding motor 8 so that the feeding speed F in the working object layers 52a to 56a immediately after being determined by the working object layer determining means 33 gradually increases or gradually reduces from the set working feeding speed F1 to F5 that is the feeding speed F immediately before determination by the working object layer determining means 33 or the set feeding speed for thrust force reduction to the set working feeding speed F2 to F6 that is the set feeding speed having been set for the working object layers 52a to 56a.

Also, the degree at which the spindle speed S and the feeding speed F gradually increase or gradually reduce is set from the viewpoint of improving the working accuracy considering the set spindle speed, the set feeding speed, the quality of the materials forming the working object layers 51a to 56a (hardness, for example), and the like.

For example, the spindle speed S and the feeding speed F in the first to sixth working object layers 51a to 56a during override control are set respectively based on the set spindle speed and the set feeding speed in the approach layer Ls immediately before the first to sixth working object layers 51a to 56a are determined by the working object layer determining means 33 and the first to fifth working object layers 51a to 55a during drilling work (equivalent to the preceding working object layer out of two working object layers adjoining each other in order of drilling work), or based on the set spindle speed and the set feeding speed in the first to sixth working object layers 51a to 56a immediately after the first to sixth working object layers 51a to 56a are determined by the working object layer determining means 33 (equivalent to the following working object layer out of two working object layers adjoining each other in order of drilling work).

Accordingly, as an example of the set spindle speed and the set feeding speed that become bases for setting the spindle speed S and the feeding speed F during override control, it is also possible to constantly select the set spindle speed and the set feeding speed in the working object layer where the set spindle speed and the set feeding speed are higher out of the working object layers immediately before and immediately after being determined by the working object layer determining means 33 (equivalent to the two working object layers adjoining each other in order of drilling work).

Also, as shown in FIG. 2(b), the drill 4 includes a conical shape part 4c where the outside diameter changes from the top end 4a thereof to a shoulder 4b (a portion where the outside diameter of the drill 4 becomes the maximum). Accordingly, when the length Lt of the conical shape part 4c is shorter than the thickness of each of the working object layers 51a to 56a, it is preferable that override control is executed in a predetermined thickness range of the length Lt or less in the respective working object layers 51a to 56a. Therefore, when override control is executed, it is necessary to select a drill considering the thickness of the working object layers 51a to 56a or to combine the drill 4 and the workpiece 50 according to the drill 4 and the thickness of the working object layers 51a to 56a.

Further, the feeding drive controlling means 42 executes acceleration control of the feeding speed F and control of the limiter value of the torque limiter 8a (refer to FIG. 1 (b)).

More specifically, when the drill 4 that has been in a rotation stop state starts moving forward from the initial position Ps, acceleration of the feeding speed F of the feeding motor 8 is set at acceleration in approach process that is less than acceleration in working when drilling work is executed for the workpiece 50 in the approach process (or the approach layer Ls). Thus, sharp increase of the electric current supplied to the feeding motor 8 can be suppressed.

Also, in the feeding drive controlling means 42, in order to reduce impact applied to the drill 4 at the time point the drill 4 contacts on the workpiece 50, in the approach process (or the approach layer Ls) and in the approach process in step feeding in which the drill 4 that has tentatively moved backward in the backward process in step feeding moves forward until contacting on the workpiece 50 again, the limit value of the torque limiter 8a is set to an approach limit value smaller than a limit value in working when the workpiece 50 is worked.

The detecting condition changing means 38 that changes a detecting function by the load torque detecting means 22 changes the number of times of sampling executed at every predetermined temporal interval by the load torque detecting means 22 in the approach process and the approach process in step feeding so as to become less than the number of times of sampling during drilling work. Thus, because variation in the motor current value caused by contact of the workpiece 50 and the drill 4 on each other (accordingly, variation in the load torque T) can be detected sensitively, detection of contact of the workpiece 50 and the drill 4 on each other can be made quicker, and the control responsibility of the spindle motor 7 and the feeding motor 8 in starting drilling work can be improved.

Also, the detecting condition changing means 38 executes a masking process in order to prevent erroneous determination of the working object layer by working layer determining means caused by sharp variation in the motor current value immediately after switching and in order to prevent erroneous determination of the working object layer by the working layer determining means caused by sharp variation in the motor current value immediately after shifting from the backward process in step feeding in step feed working to the approach process in step feeding in switching of the working object layer when the absolute value of the torque variation coefficient ΔT becomes a predetermined variation coefficient or more.

This masking process includes not to detect the motor current value, or to exclude the motor current value detected from calculation of the average value. Because the motor current value that becomes noise in detecting the load torque T is ignored by this masking process, detection accuracy of the load torque detecting means 22 improves.

Figure 4:
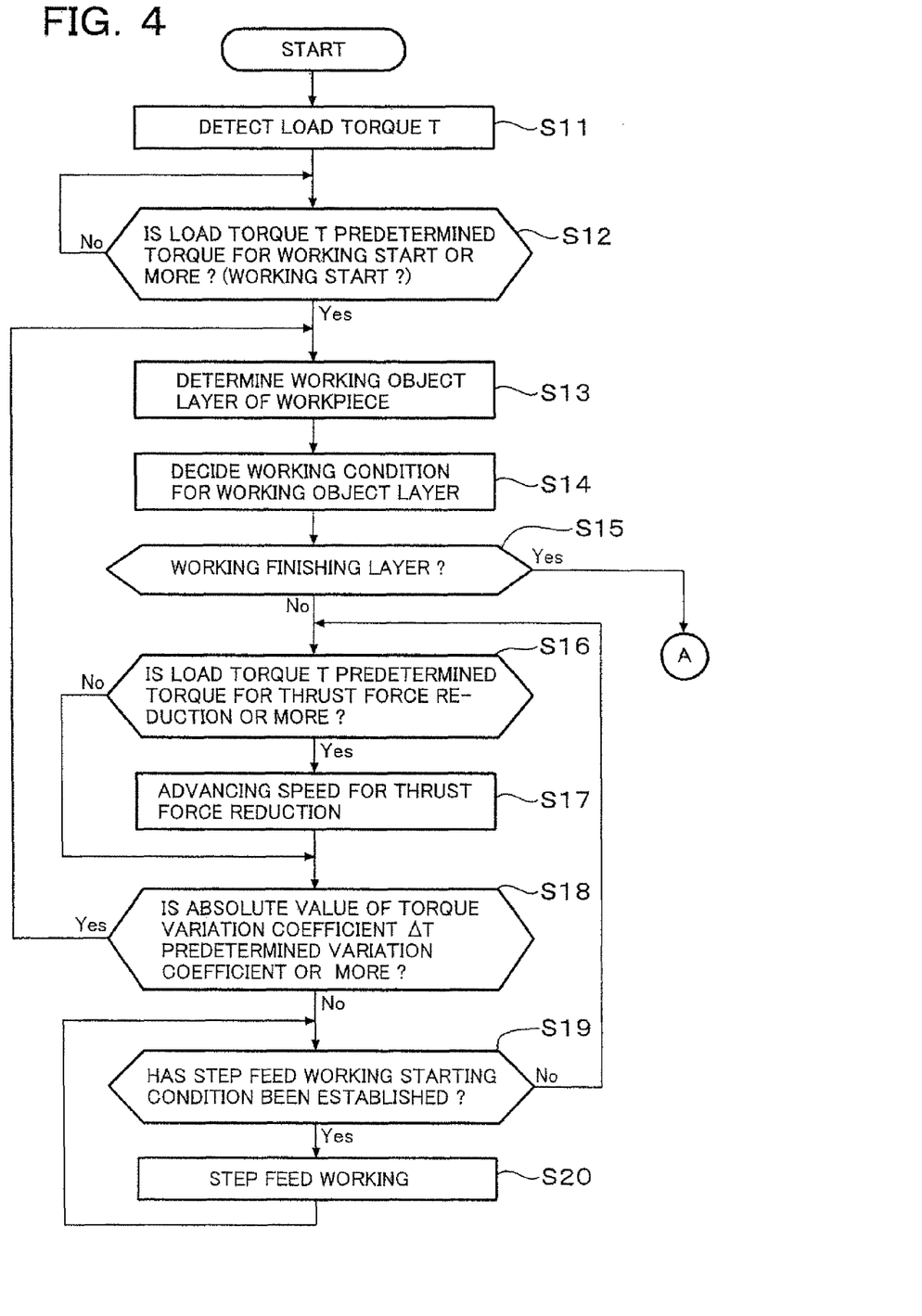
FIG. 4 is a part of a flowchart explaining an essential part of a drive control process of a drive system by the control panel of the drilling work device of FIG. 1.
Figure 5:
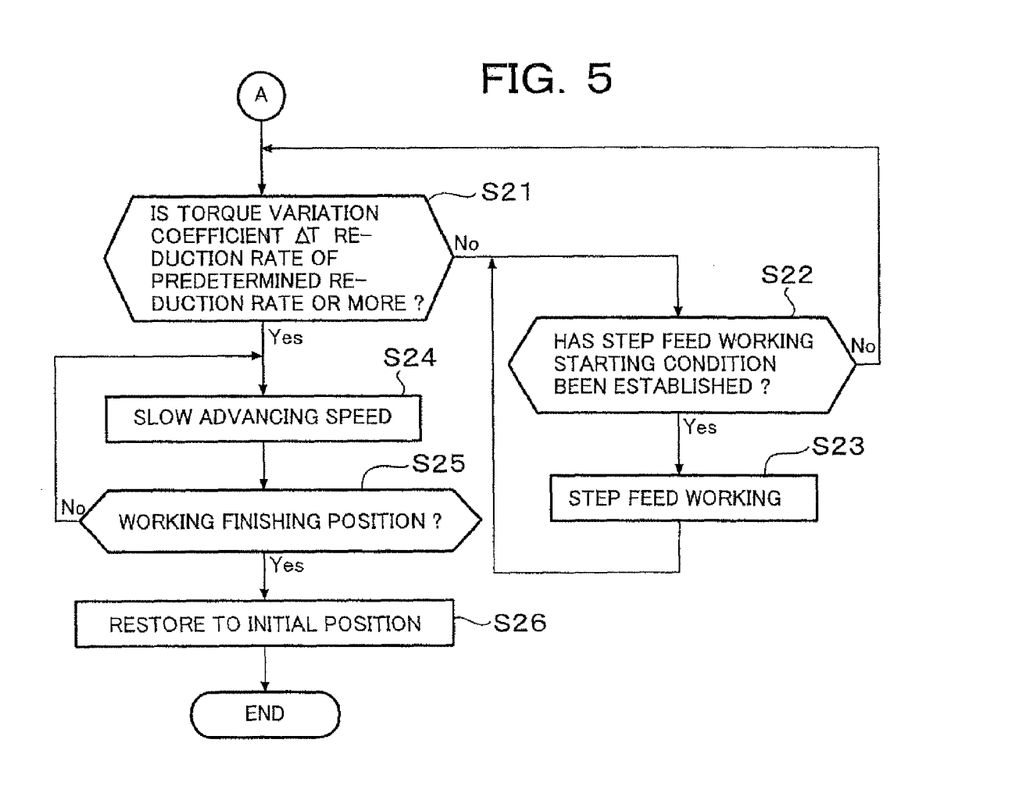
FIG. 5 is a remaining part of the flowchart of FIG. 4.

With reference mainly to FIG. 4, FIG. 5 while referring to FIG. 1 to FIG. 3 according to the necessity, the drive control process of the spindle motor 7 and the feeding motor 8 executed by the control system 15 in a drilling work control method by the drilling work device 1 will be described.

The working data including working conditions such as the layout of the first to sixth working object layers 51a to 56a in the workpiece 50 as well as the spindle speed S and the feeding speed F and the like are set through the operation panel 17, then operation of the drilling machine 2 is started, and, thereafter in step S11 as a load torque detecting step, the load torque T applied to the drill 4 is detected constantly by the load torque detecting means 22 while the drilling machine 2 is operated.

Then, in step S12 as a working start determining step, the load torque T of the drill 4 that is moving forward in the approach layer Ls from the initial position Ps toward the workpiece 50 is detected by the load torque detecting means 22, and whether or not the load torque T has changed by a predetermined torque for working start or more is determined by the working start determining means 31. The working start determining means 31 determines that the drill 4 has contacted on the workpiece 50, accordingly, determines to be working start by the drilling machine 2, when the load torque T has become the predetermined torque for working start or more, and determines that the drill 4 is in the approach process when the load torque T is less than the predetermined torque for working start.

Because the working start determining means 31 determined to be working start in step S12, the working object layer determining means 33 determines that the working object layer of drilling work executed immediately after the determination is the first working object layer 51a in step S13, and, then in step S14, the working condition deciding means 34 decides the set working spindle speed S1 and the set working feeding speed F1 corresponding to the first working object layer 51a. Also, the spindle drive controlling means 41 and the feeding drive controlling means 42 control the spindle motor 7 and the feeding motor 8 so that the drill 4 is driven at the set working spindle speed S1 and the set working feeding speed F16, and drilling work is executed for the first working object layer 51a.

Then, in step S15, whether or not the working object layer that was determined in step S13 is the working finishing layer (the sixth working object layer 56a in this embodiment) is determined. In the present case, because the working object layer is the first working object layer 51a and is not the sixth working object layer 56a, the process goes to step S16, and whether or not the load torque T applied to the drill 4 during working the first working object layer 51a that is the preceding working object layer is a predetermined torque for thrust force reduction or more is determined by the determining means 36 for thrust force reduction. When it has been determined that the load torque T of the predetermined torque for thrust force reduction or more has been applied to the drill 4, in step S17, the working condition deciding means 34 decides the set feeding speed for thrust force reduction that is slower than the set working feeding speed F1 in the first working object layer 51a in order to prevent or suppress occurrence of deflection caused by a thrust force of the drill 4 in the second working object layer 52a that is the following working object layer.

When the load torque T applied to the drill 4 during working the first working object layer 51a is less than the predetermined torque for thrust force reduction in step S16, the process goes to step S18, and the working object layer determining means 33 determines whether or not the absolute value of the torque variation coefficient ΔT calculated by the torque variation coefficient calculating means 32 is a predetermined variation coefficient or more.

When the torque variation coefficient ΔT is less than the predetermined variation coefficient, the process goes to step S19, whether or not the step feed working start condition has been established is determined, and, when the working start condition has been established, step feed working is executed in step S20. When the working start condition is not established in step S19, the process goes to step S16, steps S16 to S18 are executed, and drilling work for the first working object layer 51a is continued.

When it has been determined that the absolute value of the torque variation coefficient ΔT is the predetermined variation coefficient or more in step S18, the working object layer determining means 33 determines that the working object layer has been switched from the first working object layer 51a to the second working object layer 52a in step S13, the working condition deciding means 34 decides the set working spindle speed S2 and the set working feeding speed F2 corresponding to the second working object layer 52a, the spindle motor 7 and the feeding motor 8 controlled by the spindle drive controlling means 41 and the feeding drive controlling means 42 respectively drive the drill 4 at the set working spindle speed S2 and the set working feeding speed F2, and drilling work is executed for the second working object layer 52a in step S14.

Thereafter, until it is determined that the working object layer is the sixth working object layer 56a (that is, the working finishing layer) in step S15, steps S13 to S20 are executed repeatedly, and up to the third to sixth working object layers 53a to 56a are determined one by one.

Also, it is determined that the working object layer is the sixth working object layer 56a in step S13, it is determined that the present working object layer is the working finishing layer in step S15, and the process goes to step S21.

Accordingly, steps S13, S18 constitute a working object layer determining step that determines the forming layers 51 to 56 of the workpiece 50 respectively as two or more working object layers 51a to 56a arrayed in the feeding direction in order of drilling work, and step S14 constitutes a working condition deciding step that decides the spindle speed S and the feeding speed F corresponding to materials that form the working object layers 51a to 56a determined in the working object layer determining step. Also, steps S16, S17 constitute a thrust force reducing step that employs an feeding speed for thrust force reduction that is slower than the working feeding speed in the preceding working object layer in order to reduce the thrust force applied to the following working object layer by the drill 4.

In step S21, the immediately before penetration determining means 37 determines whether or not the torque variation coefficient ΔT is a reduction rate of the predetermined reduction rate or more and, when the load torque T has not reduced by the predetermined reduction rate or more, determines to have not reached the immediately before penetration position Pa, the process goes to step S22, step feed working is executed similarly to steps S19, S20 when the step feed working start condition has been established, whereas when the working start condition has not been established, drilling work is executed for the sixth working object layer 56a at the set working spindle speed S6 and the set working feeding speed F6 until it is determined in step S21 that the load torque T has reduced by the predetermined reduction rate or more to determine that the drill 4 has reached the immediately before penetration position Pa.

When it is determined that the drill 4 has reached the immediately before penetration position Pa in step S21, the process goes to step S24, the working condition deciding means 34 decides the feeding speed F at the set slow feeding speed Ff, and the feeding speed F is decelerated from the set working feeding speed F6 to the set slow feeding speed Ff in a state where the spindle speed S is maintained at the set working spindle speed S6.

The drill 4 is maintained at the set slow feeding speed Ff until reaching the working finishing position Pf to execute drilling work for the sixth working object layer 56a, and moves toward the working finishing position Pf after the hole 70 has penetrated the workpiece 50. Also, when it is detected by the feeding position detecting means 21 that the drill 4 has reached the working finishing position Pf in step S25, the process goes to step S26, the working condition deciding means 34 decides the feeding speed F at the set return backward speed, and the drill 4 moves backward to the initial position Ps at a fast set return backward speed.

Here, steps S19, S20 and steps S22, S23 constitute a step feed working step for executing step feed working.

Also, steps S15, S21 constitute an immediately before penetration determining step. Accordingly, the immediately before penetration determining step includes step S15 that is a working finishing layer determining step for determining the working finishing layer and step S21 that is a load torque reduction determining step for determining that the load torque T has reduced by the predetermined reduction rate or more.

Further, step S24 constitutes a feeding speed deceleration step that makes the feeding speed F the slow feeding speed that is slower than the working feeding speed in the working finishing layer, and step S25 constitutes a working finishing position Pf detecting step for detecting the working finishing position Pf where the drill 4 penetrates the workpiece 50 and finishes drilling work.

Next, actions and effects of the embodiment constituted as described above will be described.

In the drilling work device 1 that forms the hole 70 in the workpiece 50 including a predetermined number of the forming layers 51 to 56 divided by being formed of materials of different qualities, in a drive control process of the spindle motor 7 and the feeding motor 8 by the control system 15 thereof, the working object layer determining means 33 determines the two or more working object layers 51a to 56a in order of drilling work respectively based on variation in the load torque T detected by the load torque detecting means 22 and working start determined by the working start determining means 31, the working condition deciding means 34 decides the set working spindle speed S1 to S6 and the set working feeding speed F1 to F6 corresponding to the forming material of the working object layers 51a to 56a determined by the working object layer determining means 33, and the spindle drive controlling means 41 and the feeding drive controlling means 42 control the spindle motor 7 and the feeding motor 8 so that the drill 4 forms the hole 70 over the two or more working object layers 51a to 56a at the set working spindle speed S1 to S6 and the set working feeding speed F1 to F6.

Thus, in the workpiece 50 including the forming layers 51 to 56 of the predetermined number, the two or more working object layers 51a to 56a where drilling work is executed are automatically determined through detection of the load torque T applied to the drill 4, and drilling work can be executed for the respective working object layers 51a to 56a determined in a working condition corresponding to each of the working object layers 51a to 56a decided by the working condition deciding means 34. As a result, with respect to the two or more working object layers 51a to 56a formed with the hole 70, it is not necessary to set the position of the working object layers 51a to 56a in the feeding direction beforehand for each of the working object layers 51a to 56a and to set the feeding amount of the feeding motion every time the working object layers 51a to 56a are switched corresponding to the thickness of the respective working object layers 51a to 56a, therefore drilling work in the working condition set for each working object layer is facilitated, and working efficiency can be improved.

The working start determining means 31 of the control system 15 determines working start by determining contact of the workpiece 50 and the tool on each other to represent that the load torque T is a predetermined torque for working start or more based on variation of the load torque T. Thus, because working start of drilling work is determined utilizing the load torque T detected for determination of the working object layers 51a to 56a by the working object layer determining means 33, exclusive detecting means for determining the working start is not required, and the cost of the drilling work device 1 can be reduced. Also, adjustment of the approach distance Ds between the initial position Ps of the drill 4 and the workpiece 50 in the feeding direction and setting of the feeding amount until contact of the workpiece 50 and the tool on each other are not required which contributes to improvement of the working efficiency.

Also, with respect to the feeding speed F of the drill 4, the approach feeding speed in the approach process, the return backward speed in the return to origin process, the approach feeding speed in step feeding and the backward speed in step feeding in step feed working are faster than the working feeding speed in the respective working object layers 51a to 56a, therefore the working time can be shortened and the working efficiency improves.

In the drive control process by the control system 15, the immediately before penetration determining means 37 determines that the drill 4 is at the immediately before penetration position Pa immediately before penetrating the workpiece 50 in the sixth working object layer 56a that is the working finishing layer, and the feeding speed F is decelerated so that the feeding motion is executed at a slow feeding speed that is slower than the working feeding speed for the sixth working object layer 56a since the drill 4 starts from the immediately before penetration position Pa inside the sixth working object layer 56a of the workpiece 50 until penetrating the workpiece 50 and reaching the working finishing position Pf, therefore occurrence of the quality deteriorating shape such as a burr and the like in the working finishing layer where the end terminal opening 71 of the hole 70 opens can be suppressed, and the quality of the workpiece 50 formed with the hole 70 improves.

In the drive control process by the control system 15, the immediately before penetration determining means 37 determines that the drill 4 is at the immediately before penetration position Pa when the working object layer determining means 33 determines the working finishing layer and it is determined that the load torque T has reduced by the predetermined reduction rate or more based on the torque variation coefficient T.

Thus, in the workpiece 50 including the two or more working object layers 51a to 56a, the sixth working object layer 56a that is the working finishing layer is automatically determined by the working object layer determining means 33 and the immediately before penetration position Pa of the drill 4 in the sixth working object layer 56a is determined utilizing the load torque T detected for determining the working object layers 51a to 56a, therefore exclusive detecting means for determining the immediately before penetration position Pa is not required, and the cost of the drilling work device 1 can be reduced. Also, setting of the feeding amount for determining the immediately before penetration position Pa is not required which contributes to improvement of the working efficiency.

When the two working object layers 51a, 52a; 52a, 53a; 53a, 54a; 54a, 55a; 55a, 56a arrayed so as to be adjoining each other in a preceding and following positional relation in order of drilling work are made a preceding working object layer and a following working object layer in the two or more working object layers 51a to 56a of the workpiece 50, in the drive control process of the control system 15, when the determining means 36 for thrust force reduction determines that the load torque T is a predetermined torque for thrust force reduction or more during drilling work for the preceding working object layer, in order to reduce a thrust force by the drill 4, the working condition deciding means 34 decides the working feeding speed at the set feeding speed for thrust force reduction that is slower than the set working feeding speed F1 to F6 in the preceding working object layer.

Thus, because the feeding speed F in the preceding working object layer is decelerated to the feeding speed for thrust force reduction, the thrust force of the drill 4 applied to the following working object layer reduces, therefore deflection of the following working object layer by an action of the thrust force is suppressed by prevention of occurrence of the deflection or reduction of the deflection, occurrence of delamination between the preceding working object layer and the following working object layer (that is, the quality deteriorating shape) can be suppressed, and the quality of the workpiece 50 formed with the hole 70 improves.

The working object layer determining means 33 and the immediately before penetration determining means 37 determine the respective working object layers 51a to 56a and the immediately before penetration position Pa respectively based on the torque variation coefficient ΔT that is a rate of the variation torque amount of the load torque T to the load torque T, and therefore excellent determination accuracy of the working object layers 51a to 56a can be secured even when the tool is worn due to secular change compared with a case in which the working object layers 51a to 56a are determined according to variation of the absolute value of the load torque T.

The spindle drive controlling means 41 override-controls the spindle motor 7 so that the spindle speed S for the working object layers 51a to 56a immediately after having been determined by the working object layer determining means 33 gradually increases or gradually reduces from the set approach spindle speed Ss that is the spindle speed S immediately before the determination to the set working spindle speed S1 via the predetermined spindle speed with respect to the first working object layer 51a, and from the first to fifth set working spindle speed S1 to S5 to the second to sixth set working spindle speed S2 to S6 with respect to the second to sixth working object layers 52a to 56a. Similarly, the feeding drive controlling means 42 override-controls the feeding motor 8 so that the feeding speed F of the working object layers 51a to 56a immediately after the determination gradually increases or gradually reduces from the set approach feeding speed Fs that is the feeding speed F immediately before the determination to the set working feeding speed F1 via the predetermined feeding speed with respect to the first working object layer 51a, and from the first to fifth set working feeding speed F1 to F5 or the set feeding speed for thrust force reduction to the second to sixth set working feeding speed F2 to F6 with respect to the second to sixth working object layers 52a to 56a.

Thus, when drilling work is started for the respective working object layers 51a to 56a having been determined by the working object layer determining means 33, the spindle speed S and the feeding speed F in the working object layers 51a to 56a reach the set spindle speed and the set feeding speed after having gradually changed from the spindle speed S and the feeding speed F immediately before determination of the respective working object layers 51a to 56a by the working object layer determining means 33, therefore the working accuracy of the hole 70 improves, and the quality of the workpiece 50 improves.

The relation between the load torque for step feeding and the working time for step feeding for executing step feed working of the feeding motion is set beforehand corresponding to the working object layers 51a to 56a, and the working restart determining means for step feeding included in the control system 15 determines contact of the workpiece 50 and the drill 4 on each other in step feed working based on variation of the load torque T.

Thus, even when deep hole working is required for at least one of the two or more working object layers 51a to 56a, step feed working that executes drilling work while removing working chips is executed, and therefore drilling work of high accuracy becomes possible for the workpiece 50 formed of materials of different qualities. Also, because contact of the workpiece 50 and the tool on each other, that is, restart of drilling work, is determined utilizing the load torque T, setting of the feeding amount until contact of the workpiece 50 and the drill 4 on each other is not required which contributes to improvement of the working efficiency.

In the storage device of the control system 15, the layout of the working object layers 51a to 56a in order the hole 70 is formed, the set spindle speed and the set feeding speed in the respective working object layers 51a to 56a are stored before operation of the drilling machine 2 is started by operation from the operation panel 17, therefore setting of the spindle speed S and the feeding speed F every time the working object layers 51a to 56a are switched is not required, and the working efficiency can be improved.

Below, with respect to an embodiment in which a part of the constitution of the embodiment described above has been changed, the constitution changed will be described.

The tool may be a known drilling tool other than the drill 4.

Although the hole 70 was formed in the workpiece 50 that included layers of a predetermined number over the layers of the predetermined number in the embodiment described above, the hole 70 may be formed over working object areas (or working object layers) of two or more other than the predetermined number. The hole 70 may be a hole whose end terminal part is closed, that is, a bottomed hole, instead of a through hole.

The drive system may make the workpiece 50 or both of the workpiece 50 and the tool execute at least either motion of rotating motion and feeding motion. For example, the spindle drive system may rotatingly drive the workpiece 50 instead of the drill 4 through a spindle 9a, and, when the workpiece 50 is driven by the feeding drive system, the feeding position detecting means 21 detects the position of the workpiece 50 in the feeding direction.

The load torque detecting means 22 may be one that detects a motor drive signal value for driving at least either one of the feeding motor 8 and the spindle motor 7.

The housing 5 may be supported by a support stand so as to be movable in the feeding direction, and a feeding drive system may be fixed to the support stand so as to be able to drive the housing 5 and the spindle drive system integrally in the feeding direction.

Combination of the materials may be metals of plural kinds, metal and a synthetic resin, and plural composite materials. The non-metal layer may be of plastics other than fiber reinforced plastics, and may be of materials other than plastics.

The drive system may be an air motor instead of an electric motor, and a motor drive signal value is air pressure in that case.

Figure 6:
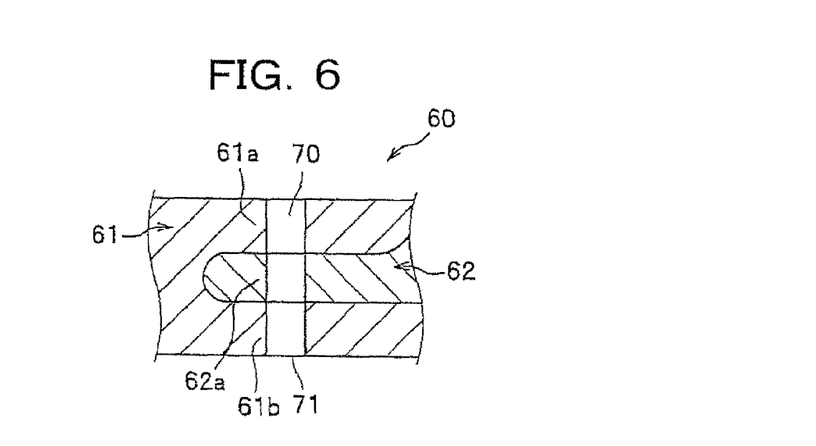
FIG. 6 is a drawing equivalent to FIG. 2(a) of a separate workpiece worked by the drilling work device of FIG. 1.

The workpiece may be one in which a member with different quality is inserted. For example, as shown in FIG. 6, a workpiece 60 may be one that includes plural forming areas 61, 62 where materials with the quality different from that of a material forming a base material are embedded in the base material, and a peripheral portion where the hole 70 having the end terminal opening 71 is formed may form a laminate structure locally as first to third working object layers 61a, 62a, 61b. Here, the third working object layer 61b is the working finishing layer.

The immediately before penetration determining means 37 may be one that determines the immediately before penetration position Pa immediately before penetrating a specific working object layer that is a working object layer other than the working finishing layer as a position in the feeding direction. More specifically, by detecting the immediately before penetration position Pa set beforehand through the operation panel 17 by the feeding position detecting means 21 as a position in the feeding direction, two or more working object layers of the workpiece 50 include a working finishing layer where the end terminal part of the hole 70 is formed and a specific working object layer that is a working object layer other than the working finishing layer, the drive control process includes an immediately before penetration determining step that determines that the tool is at the immediately before penetration position Pa immediately before penetrating the specific working object layer and a feeding speed decelerating step that makes the working feeding speed a slow feeding speed that is slower than the working feeding speed in the specific working object layer, and the control system 15 controls the feeding motor 8 so that the drill 4 moves at the slow feeding speed from the immediately before penetration position Pa until penetrating the specific working object layer.

Thus, because the feeding motion is executed at the slow feeding speed that is slower than the working feeding speed for the specific working object layer since the tool starts from the immediately before penetration position Pa inside the specific working object layer other than the working finishing layer of the workpiece 50 until penetrating the specific working object layer, deflection of the working object layer adjoining the specific working object layer in the feeding direction is suppressed by a thrust force caused by the feeding motion of the tool from the immediately before penetration position Pa until penetrating the specific working object layer, occurrence of delamination between the specific working object layer and the adjoining working object layer can be suppressed, and the quality of the workpiece 50 formed with the hole 70 improves. Also, with respect to the forming material itself of the specific working object layer, when fiber reinforced plastics as a composite material for example has a laminated structure of fiber layers, coming off between the fiber layers is prevented.

The working finishing layer may be formed of a composite material (for example, CFRP). In this case, due to the low feeding speed, occurrence of a scuff in the peripheral edge of the end terminal opening 71 and delamination in the laminated structure which the composite material itself has can be prevented. Further, with respect to the forming material itself of the specific working object layer, when the fiber reinforced plastics as a composite material for example has a laminated structure of fiber layers, coming off between the fiber layers is prevented.

The spindle speed S in the second to sixth working object layers 52a to 56a in override controlling may be the set working spindle speed S2 to S6 in the second to sixth working object layers 52a to 56a respectively without going through gradual increase or gradual reduction of the spindle speed S.

Also, the work device and the working control method described above are applicable also to a workpiece formed of a material of a single layer by making the forming areas those divided according to positions in the feeding direction.

REFERENCE SIGNS LIST

1 . . . drilling work device
2 . . . drilling machine
4 . . . drill
7 . . . spindle motor
8 . . . feeding motor
15 . . . control system
21 . . . feeding position detecting means
22 . . . load torque detecting means
31 . . . working start determining means
33 . . . working object layer determining means
34 . . . working condition deciding means
35 . . . step feed working determining means
36 . . . determining means for thrust force reduction
37 . . . immediately before penetration determining means
50, 60 . . . workpiece
70 . . . hole
Pf . . . working finishing position
Pa . . . immediately before penetration position
S1 to S6 . . . set working spindle speed
F1 to F6 . . . set working feeding speed
Ff . . . set slow feeding speed

The invention claimed is:

1. A drilling work control method by a drilling work device including a control system controlling drive systems that make a workpiece and a tool that forms a hole in the workpiece execute relative rotating motion and relative feeding motion therebetween, the workpiece includes forming areas of a predetermined number that is a plurality divided by being formed of materials of different qualities, the tool forms the hole over two or more working object layers, the drilling work control method comprising:

detecting a load torque applied to the tool;
determining a working start of drilling work for the workpiece;
determining two or more forming areas respectively in order of drilling work as two or more working object layers arrayed in a feeding direction that is a direction of the feeding motion based on a times of occurrence of variation of the load torque by a predetermined variation coefficient or more after the working start and a layout of the working object layers of the workpiece preset in the control system;
deciding a spindle speed of a rotating motion and feeding speed of the feeding motion corresponding to materials forming the working object layers that are determined;
determining that a working object layer of the working object layers is a working finishing layer, determining that the load torque has reduced by a predetermined reduction rate or more, and determining that the tool is at an immediately before penetration position that is immediately before penetrating the workpiece in the working finishing layer by sensing that a load torque reduction is the predetermined reduction rate or more in the working finishing layer,
controlling the drive systems so that the tool moves forward at a slower speed from the immediately before penetration position to a working finishing position; and
detecting the working finishing position where the tool penetrates the workpiece and finishes drilling work, and making the feeding speed a slow feeding speed that is slower than a working feeding speed in the working finishing layer.

2. The drilling work control method according to claim 1, wherein
when the two working object layers arrayed so as to be adjoining each other in a preceding and following positional relation in order of drilling work are made a preceding working object layer and a following working object layer in the two or more working object layers,
a feeding speed is employed for thrust force reduction that is slower than the feeding speed in the preceding working object layer in order to reduce a thrust force by the tool when the load torque becomes a predetermined torque or more during drilling work for the preceding working object layer.

3. The drilling work control method according to claim 1, wherein
the control system determines the respective working object layers based on whether or not an absolute value of a torque variation coefficient that is a rate of a variation torque amount of the load torque to the load torque is a predetermined variation coefficient or more.

4. The drilling work control method according to claim 1, wherein
a relation between a load torque for step feeding and a working time for step feeding for executing step feed working of the feeding motion is set in the control system corresponding to the working object layers;
the control system determines a step feed working start condition established, when the load torque is the load torque for step feeding and when it has been detected that the working time for step feeding has elapsed; and
the control system move back the tool when the feed working start condition is established.

5. The drilling work control method according to claim 4, wherein
the load torque for step feeding is set in the control system corresponding to the working object layers excluding the object layer that is formed of CFRP.

6. The drilling work control method according to claim 1, wherein
the control system controls the drive system so that the spindle speed or the feeding speed in the working object layer immediately after the two or more forming areas are determined gradually increases or gradually reduces from the spindle speed or the feeding speed immediately before the two or more forming areas are determined to a set spindle speed or a set feeding speed.

7. A drilling work device, comprising:
a tool that forms a hole in a workpiece;
drive systems that make the workpiece and the tool execute relative rotating motion and relative feeding motion therebetween; and
a control system that controls the drive systems, wherein:
the workpiece includes forming areas of a predetermined number that is a plurality divided by being formed of materials of different qualities; and
the control system includes:
load torque detecting means that detects load torque applied to the tool;
working start determining means that determines working start of drilling work for the workpiece;
working object layer determining means that determines the two or more forming areas respectively in order of drilling work as two or more working object layers arrayed in a feeding direction that is a direction of the feeding motion based on a times of occurrence of variation of the load torque by a predetermined variation coefficient or more after the working start and a layout of the working object layers of the workpiece;
working condition deciding means that decides spindle speed and feeding speed corresponding to materials that form the working object layers determined by the working object layer determining means;
drive controlling means that controls the drive systems so as to execute the rotating motion at the spindle speed and the feeding motion at the feeding speed so that the tool forms the hole over the two or more working object layers;
an immediately before penetration determining means that determines that the tool is at an immediately before penetration position that is immediately before penetrating the workpiece in a working finishing layer by detecting a load torque reduction is a predetermined reduction rate or more in the working finishing layer, wherein the immediately before penetration determining means determines that a working object layer of the working object layers is the working finishing layer and determines that the load torque has reduced by a predetermined reduction rate or more;
a working finishing position detecting means that detects a working finishing position where the tool penetrates the workpiece and finishes drilling work; and
a working condition deciding means makes the feeding speed a slow feeding speed that is slower than a working feeding speed in the working finishing layer; wherein
the control system determines that the tool is at the immediately before penetration position when reduction of the load torque of the predetermined reduction rate or more has been determined in the working finishing layer in the immediately before penetration determining means; and
the control system controls the drive systems so that the tool moves forward at the slow speed from the immediately before penetration position to the working finishing position.

* * * * *